(12) United States Patent
Sarra et al.

(10) Patent No.: US 7,146,531 B2
(45) Date of Patent: Dec. 5, 2006

(54) REPAIRING APPLICATIONS

(75) Inventors: Anthony N. Sarra, Herriman, UT (US); David A. Eatough, Herriman, UT (US)

(73) Assignee: LANDesk Software Limited, Dublin (IE)

( * ) Notice: Subject to any disclaimer, the term of this patent is extended or adjusted under 35 U.S.C. 154(b) by 397 days.

(21) Appl. No.: 09/753,082

(22) Filed: Dec. 28, 2000

(65) Prior Publication Data

US 2002/0087914 A1 Jul. 4, 2002

(51) Int. Cl.
*G06F 11/00* (2006.01)
(52) U.S. Cl. .......................................... 714/15; 714/38
(58) Field of Classification Search ............ 714/15–16, 714/38–39, 47; 717/1, 3, 4, 8, 11, 100, 124, 717/127–128
See application file for complete search history.

(56) References Cited

U.S. PATENT DOCUMENTS

| | | | | |
|---|---|---|---|---|
| 4,796,206 A | * | 1/1989 | Boscove et al. | 714/26 |
| 5,333,308 A | * | 7/1994 | Ananthanpillai | 714/38 |
| 5,349,674 A | * | 9/1994 | Calvert et al. | 714/38 |
| 6,023,586 A | * | 2/2000 | Gaisford et al. | 717/178 |
| 6,105,148 A | * | 8/2000 | Chung et al. | 714/16 |
| 6,427,227 B1 | * | 7/2002 | Chamberlain | 717/3 |
| 6,543,007 B1 | * | 4/2003 | Bliley et al. | 714/26 |
| 6,634,000 B1 | * | 10/2003 | Jammu et al. | 714/37 |
| 6,640,317 B1 | * | 10/2003 | Snow | 714/38 |

* cited by examiner

*Primary Examiner*—Dieu-Minh Le
(74) *Attorney, Agent, or Firm*—Madison & Austin

(57) ABSTRACT

Repairing applications includes detecting a failure in a request for a file made by a program running on a device and initiating a repair mechanism that is configured to repair the detected failure.

27 Claims, 6 Drawing Sheets

REPAIRING APPLICATIONS

BACKGROUND

This invention relates to repairing applications.

An application is a software-based configuration program, for example, that runs on a system having processing capabilities such as a mobile or stationary computer. An application may cease to function properly if one of its files, libraries, or other pre-compiled components fails. A component can fail if it is deleted from the system running the application or otherwise becomes disabled, e.g., becomes infected with a virus or changes storage locations and therefore becomes inaccessible.

A user of the application may detect a failed component and manually alert the system of the failure. Alternatively, a software-based shortcut application or a software-based shortcut proxy application can identify a failed component by verifying the integrity of the application when the application is launched on the system. Before the application is launched (and becomes available for use by or on the system), the shortcut application or the proxy application checks the application's files and registry settings for any failures. If no failures are detected, the application launches. If a failure is detected, the shortcut application or the proxy application tries to repair the failed component or triggers a repairing application to try and repair the failed component.

DESCRIPTION

Figure 1:
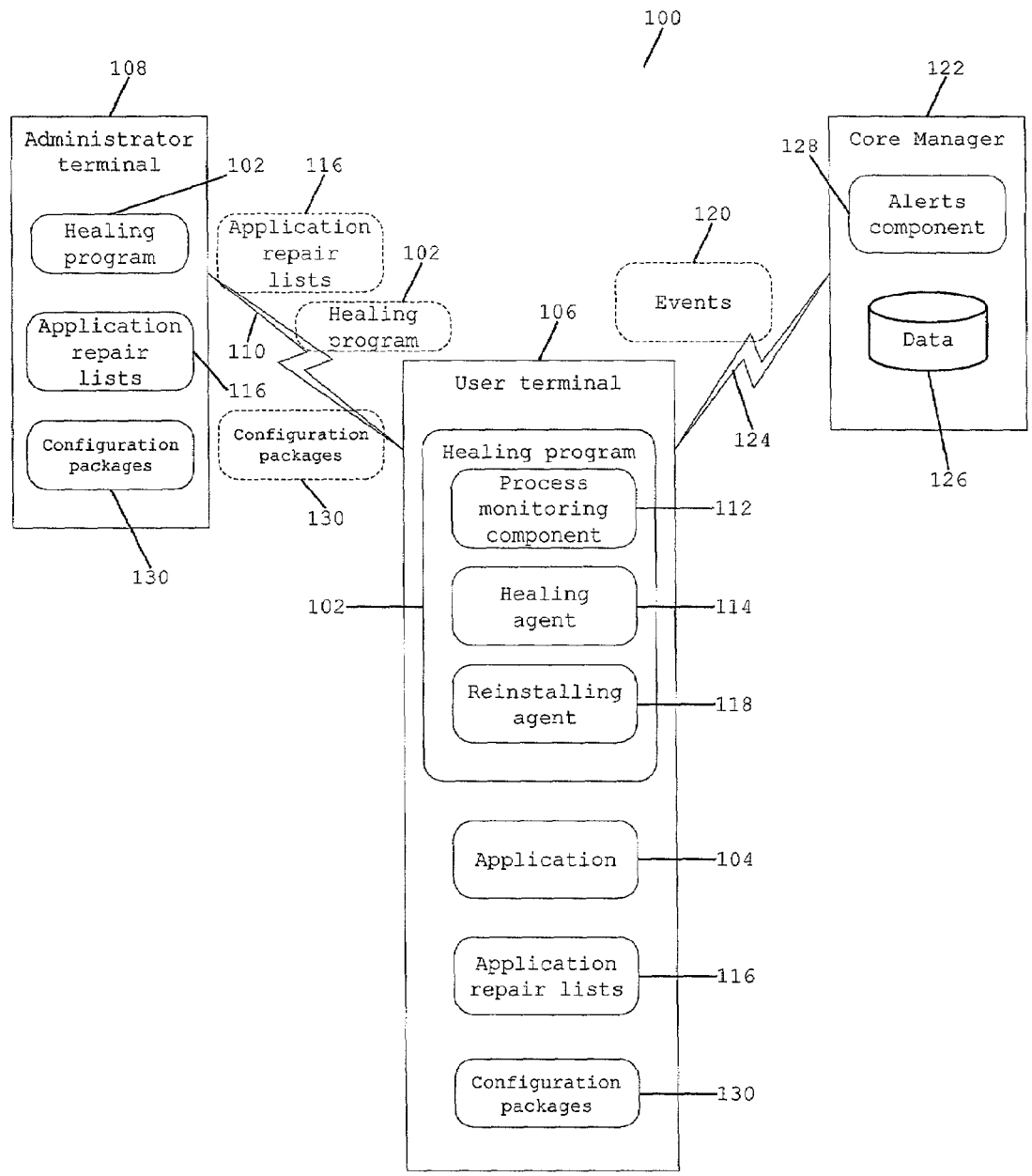
FIG. 1 is a block diagram of a network architecture.

Referring to FIG. 1, a network configuration 100 includes a healing program 102 that monitors an application 104 running on a user terminal 106. If the healing program 102 detects a failure in a system call made by the application 104, the healing program 102 initiates repair of the failed application 104. For simplicity, only one application is shown at the user terminal 106 although the user terminal 106 can include multiple applications, each of which the healing program 102 can simultaneously monitor.

The application 104 includes a collection of functions and/or data stored in binary format (or a combination of binary format and text format) and configuration information associated with the collection of functions and/or data. Examples of the application 104 include:

a) a file that the user terminal 106 directly executes such as an executable (EXE) file, a command (COM) file, a drive (DRV) file, a phone (FON) file, and other similar files, b) a collection of files that the user terminal 106 directly executes such as a dynamic link library (DLL) and other similar collections of files, and c) a routine or application program interface (API) such as Adobe Acrobat™, Paintshop Pro™, and other similar routines and APIs.

The application 104 invokes system calls such as CreateProcess (loading and initiating execution of a routine, a program that performs a specific job), LoadLibrary (loading and initiating a collection of routines), CoCreateInstance (creating an entity that can be individually selected and manipulated), OpenFile (managing the read/write history of a file), and ShortcutResolution (keeping shortcuts pointed to the correct resources).

The healing program 102 is configured by an administrator at an administrator terminal 108 and deployed to the user terminal 106 across a first communication link 110. The administrator terminal 108 and the user terminal 106 can be any device with processing, storage, and display capabilities such as a mobile computer, a stationary computer, or other similar device. The administrator is a human operator of the administrator terminal 108, although the actions of the administrator could be partially or completely electronically performed by, for example, a software program. Further, the administrator can configure the healing program 102 (and other components discussed below) from a location other than the administrator terminal 108, such as at the user terminal 106 or at a core manager 122. The administrator configures the healing program 102 to determine what package should be used to heal the application 104 in case of failure. The healing program 102 is a software-based program, although the healing program 102 could include hardware or a combination of hardware and software.

Because the user terminal 106 may include multiple applications, the administrator configures the healing program 102 for all applications that may be included at the user terminal 106. Alternatively, the administrator can configure the healing program 102 for only a subset of those applications based on design considerations.

In addition, the administrator creates configuration packages 130 that contain settings that control if and what user interface is displayed on the user terminal 106 when an application failure occurs. The configuration packages 130 are also deployed from the administrator terminal 108 to the user terminal 106 via the first communication link 110.

The healing program 102 includes a process monitoring component (PMC) 112 that monitors the application 104 for failures in system calls, e.g., in calling a routine, in creating a process, in loading a library, in accessing a shortcut, or in making other similar calls pointing to a specific memory location. Failures in these system calls indicate that the application 104 is no longer properly installed. If the PMC 112 detects a failure in the application 104, then the PMC 112 invokes a healing agent 114 included in the healing program 102 with information that the healing agent 114 needs to identify the failure.

The healing agent 114 determines if the failure is healable by comparing the application 104 with lists 116 of healable applications configured at and sent from the administrator terminal 108 to the user terminal 106. The lists 116 include lists of packages used to heal applications.

A package generally includes a collection of functions and/or data stored in binary format (or a combination of binary format and text format) and instructions that can be used to install and/or repair an application. One example of a package that can install and repair an application is a 20/20 package. A 20/20 package can be installed multiple times and supports delta installation (installation of only those parts missing from an application). A unique identifier, e.g., a globally unique identifier (GUID), identifies a 20/20 package.

The lists 116 also include information corresponding to each of the packages such as:

a) a user-friendly display name of the package, b) a unique identifier for the package, e.g., a GUID, c) a location of the package, e.g., a uniform resource locator (URL) or a uniform or universal naming convention (UNC) identifier,
d) the application(s) associated with the package, and
e) other information per design considerations.

The lists 116 are separate from the healing program 102, which makes it easier for the administrator to update or remove any particular entry in the lists 116, although the lists 116 could be included as part of the healing program 102. The administrator, as discussed further below, can update files in the lists 116 and deploy a copy of the updated lists 116 to the user terminal 106, which replaces its copy of the lists 116 with the newly deployed copy. The administrator may also be able to add or delete files in the lists 116 at the user terminal 106 while at the administrator terminal 108.

If the application 104 is healable, i.e., is included in the lists 116, the healing agent 114 determines which of the packages associated with the application 104 in the lists 116 should be used to repair the application 104. The healing agent 114 then notifies a reinstalling agent 118, which repairs the application 104.

The healing agent 114 may send events 120 regarding the failure to the core manager 122 across a second communication link 124. The core manager 122, e.g., a mobile computer, a stationary computer, a server, or other similar device records the events 120 in a collection of data 126, e.g., a database. In addition, the core manager 122 generates with an alerts component 128 any appropriate alerts regarding the events 120 for communication to the user terminal 106 and/or the administrator terminal 108 via the first communication link 110, the second communication link 124, or other network communication link. The communication links can include cables, optical fibers, point-to-point links, infrared links, cellular links, Bluetooth, satellite links, and other similar links.

Figure 2:
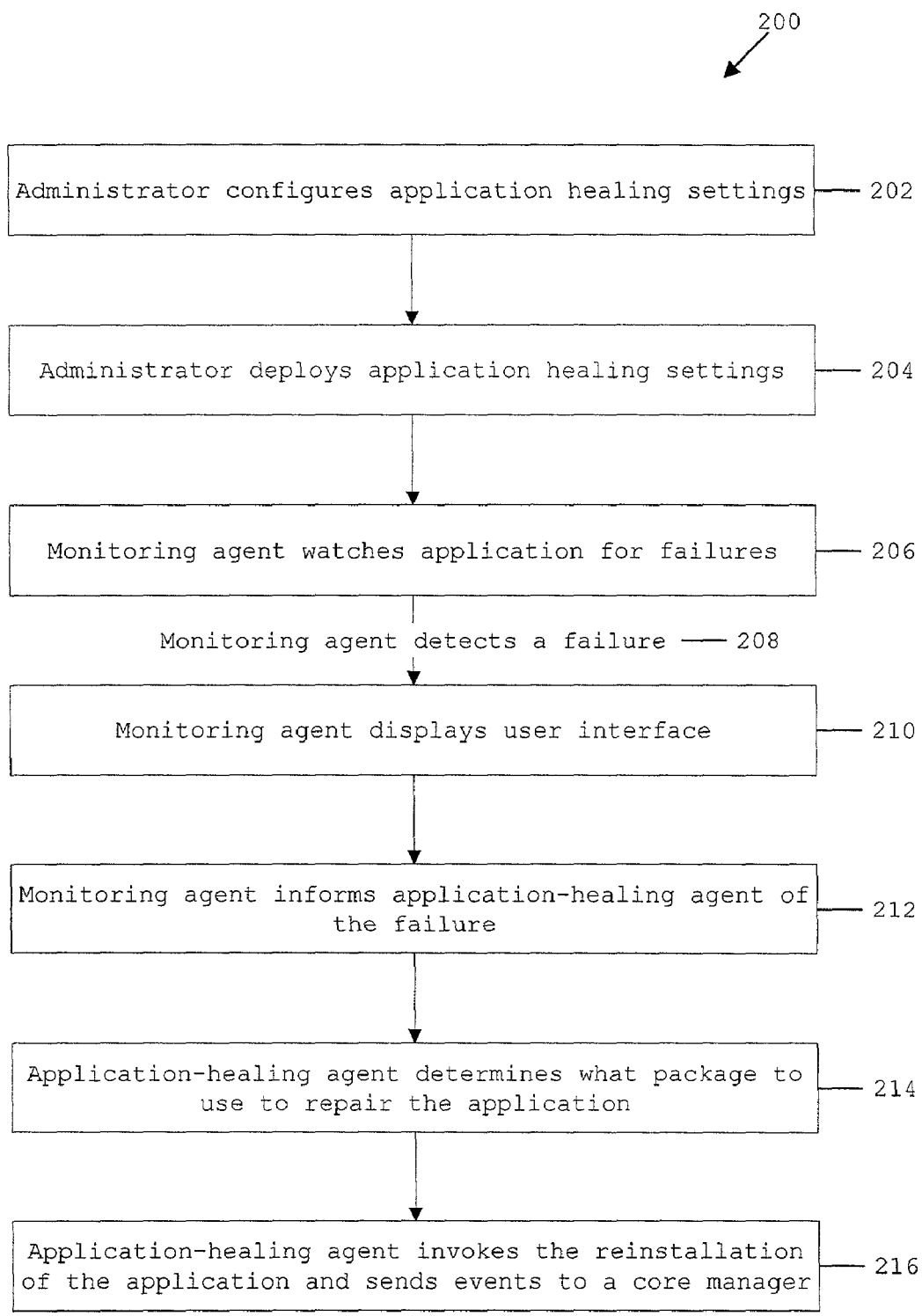
FIG. 2 is a flowchart of an application healing process.

Referring to FIG. 2, an application healing process 200 for the application 104 (see FIG. 1) is illustrated. The application healing process 200 allows the application 104 to be repaired at the user terminal 106 even if the application 104 was not originally installed with a package on the user terminal 106, e.g., the application 104 was installed with a package at the core manager 122 or other network source and the user terminal 106 obtained the application 104 from that network source.

The administrator configures 202 the application healing settings, including the healing program 102, the lists 116, and the configuration packages 130.

Figure 3:
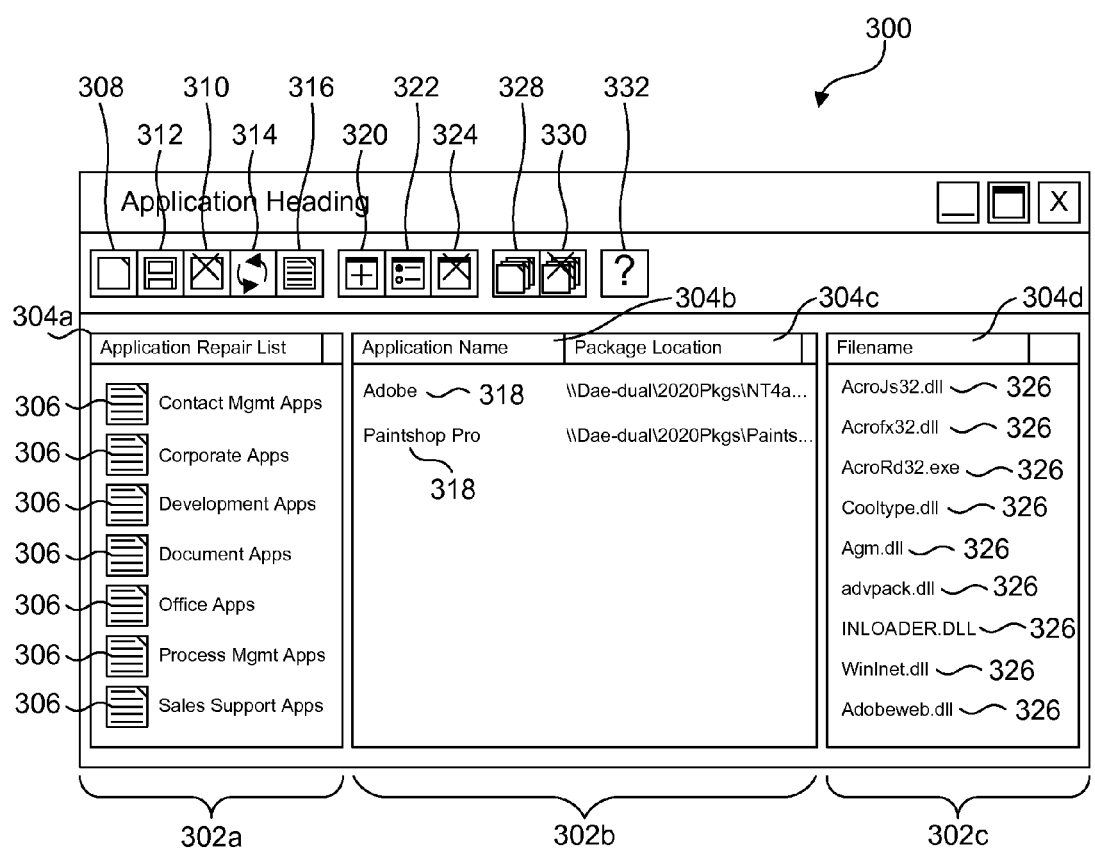
FIG. 3 shows an application healing configuration screen.

Referring to FIG. 3, an application healing plug-in screen 300 on the administrator terminal 108 enables the administrator to create, load, edit, and save the lists 116. (If configuration is performed at another terminal, the plug-in screen 300 appears on that terminal.) The plug-in screen 300 includes three panes: a lists pane 302a, an applications pane 302b, and an associated files pane 302c, each described further below. Which of the panes 302a–c the administrator can interact with depends on the currently selected item. If the administrator cannot interact with a pane 302, that pane 302 will be disabled. If the administrator can interact with a pane 302 but the pane 302 is empty, helper text is displayed in the pane 302. The helper text provides the administrator with basic hints as to what he or she should do to populate the pane 302 with data. The administrator can ask for help with the plug-in screen 300 by clicking on a help button 332. Clicking on a column title 304 alphabetically sorts the data below the title 304.

The lists pane 302a displays application repair lists (ARL) 306 (corresponding to the lists 116) stored at the core manager 122. (The ARLs 306 are stored at the core manager 122 but the administrator can access the ARLs 306 at whatever terminal the administrator uses to configure the lists 116.) Each ARL 306 includes applications grouped together according to criteria determined by the administrator, e.g., contact management applications, corporate applications, development applications, etc.

The administrator can create a new ARL 306 by clicking on a new ARL button 308. When the administrator creates a new ARL 306, the administrator is prompted to enter a name for the new application repair list 306. Selecting an ARL 306 causes the ARL 306 to be loaded, meaning that its contents are displayed in the applications pane 302b and the associated files pane 302c. Once loaded, the administrator can modify the ARL 306, including deleting the ARL 306 by clicking on a delete ARL button 310. The administrator saves an ARL 306 by clicking on a save ARL button 312. The administrator is prompted to save changes made to an ARL 306 when the administrator selects another ARL 306, schedules an ARL script, or closes the plug-in screen 300. The administrator can schedule ARLs 306 by clicking on a schedule ARL button 316. This brings up a dialog box that allows the administrator to deploy or remove the ARL 306 to the user terminal 106 (and/or any other terminals that the administrator chooses or that are programmed to receive data and/or commands from the administrator). The plug-in screen 300 is not dynamically updated (although it could be dynamically updated), so if another administrator creates or modifies an ARL 306, the changes do not appear on the plug-in screen 300 until the administrator clicks on a refresh ARL button 314.

The applications pane 302b displays applications 318 currently included in the currently selected (highlighted) list 306 in the lists pane 302a. Two items are displayed for each application 318: a user-friendly application name (under the column title 304b) and a package location (under the column title 304c). The administrator can add, edit, and delete applications 318 by clicking on a new application button 320, an edit application button 322, and a delete application button 324, respectively. Multiple applications 318 can be associated with each ARL 306, but duplicate copies of the same application 318 cannot be added to the same ARL 306. Packages are considered duplicates if their identification, e.g., GUID, matches a package identification stored for a package already in the applications pane 302b. The applications pane 302b includes packages usable by the reinstalling agent 118.

The associated files pane 302c contains files 326 associated with the package location currently selected (highlighted) in the applications pane 302b. The healing agent 114 uses the files 326 to determine when an application 318 should be repaired as described further below. The administrator can add and delete files 326 by clicking on an associate files button 328 and a delete files button 330, respectively.

Referring back to FIG. 2, the healing program 102, the configuration packages 130, and the lists 116 are deployed 204 from the administrator terminal 108 to the user terminal 106 across the communication link 110. If the healing program 102, the configuration packages 130, and/or the lists 116 are configured at the user terminal 106, the user-configured elements need not be deployed to the user terminal 106. Further, the healing program 102 may be included in a collection of programs, in which case the healing program 102 is deployed to the user terminal 106 as part of the collection of programs.

The lists 116 are stored at the user terminal 106 within the same directory as the healing program 102. Thus, in determining whether an application is healable, the healing program 102 can scan its own directory for application repair files, e.g., files having a particular extension such as the ARLs 306 (see FIG. 3), included in the lists 116.

Deployed to the user terminal 106, the healing program 102 begins running when the user terminal 106 boots up and continues running in the background as necessary to detect errors. The PMC 112, e.g., a DLL, monitors 206 the application 104 for errors while the application 104 is running. The PMC 112 monitors the application 104 for errors by monitoring system calls made by the application 104. When the application 104 makes a system call, the PMC 112 hooks the system call, meaning that the PMC 112 splices in a function to determine if an error occurred before the call is actually placed to the called function.

The PMC 112 may not be able to determine if an error occurred without first closing an error dialog box. The error dialog box appears on the user terminal 106 when an error occurs and identifies the error that occurred. The error dialog box typically remains open until the user at the user terminal 106 closes the error dialog box. While the error dialog box is open, the PMC 112 cannot identify the error code, as the called function is listed as pending. The PMC 112 can send a message to close the error dialog box, without any user intervention, which removes the error code's pending status and enables the PMC 112 to identify the error code.

For example, the PMC 112 monitors for LoadLibrary errors in a Windows environment by monitoring LoadLibrary system calls sent by the application 104. The system call includes error code information, among other LoadLibrary information, generated by the Windows system. If the PMC 112 determines in a Windows 9x environment that the error code value ranges from zero to thirty-one (inclusive) or in a Windows NT or 2000 environment that the error code equals zero (null), then an error has occurred and the PMC 112 has detected a failure.

In another example, the PMC 112 monitors for CreateProcess errors in a Windows environment by monitoring CreateProcess calls sent by the application 104. Like the LoadLibrary system call, the CreateProcess call includes error code information, typically a Boolean value. In a Windows 9x environment, if the PMC 112 determines that the error code is FALSE (or TRUE depending on system configuration), then an error occurred. If an error occurred, the PMC 112 determines if the error is reported in any open error dialog box, and if so, the PMC 112 closes the error dialog box.

In a Windows NT or Windows 2000 environment, however, the PMC 112 may not be able to tell if an error occurred by monitoring the Boolean value because the Boolean value TRUE (or FALSE depending on system configuration) may be used to indicate that the called function was created, not necessarily that the called system is functioning properly or that no error dialog boxes are open for that called function. Thus, the PMC 112 determines whether the Boolean value TRUE (or FALSE) indicates an actual error.

The PMC 112 waits briefly, e.g., one-quarter of a second, before checking the called function's status in case the event that triggered the TRUE (or FALSE) Boolean value clears for the called function. After waiting, the PMC 112 checks a code indicating whether the called function is running or not, such as an exit code. If the called function is not still running, the PMC 112 enumerates all existing error dialog boxes, e.g., by calling an EnumWindows function and gathering information about each of the error dialog boxes, such as the function associated with the error reported in each error dialog box. The PMC 112 searches the gathered information to find out if an error occurred in the called function. If an error has occurred, then the PMC 112 closes the appropriate error dialog box.

If the code indicates that the called function is pending, then the called function is still operating. The PMC 112 tests an exit code for the called function to determine what the exit code means for that function, as it may indicate that an error occurred. How to test the exit code is determined experimentally. In a Windows NT environment, the PMC 112 tests a portion of the exit code that would correspond to a facility code if the exit code were a SCODE (a long integer value used to pass information about the called function to the application that called the function). On a sixteen bit platform and a thirty-two bit platform, the PMC 112 respectively tests bits nineteen to sixteen of the exit code and bits twenty-seven to sixteen of the exit code. If this portion of the exit code is negative, then an error occurred. If the portion of the exit code is zero (null), an error still may have occurred, so the PMC 112 checks the exit code's DWORD. If the DWORD equals zero, one, or two, the PMC 112 decides that an error likely occurred.

When the PMC 112 detects 208 a failure in one of the system calls, the PMC 112 may display 210 a user interface to the user at the user terminal 106 that gives the user the ability to control the error's healing. Whether the healing program 102 displays the user interface and what elements are displayed on the user interface depends on various factors such as the type of failure that occurred and/or how the healing program 102 and/or the user terminal 106 are configured by the administrator.

For example, the healing program 102 may be configured to display a user interface when the PMC 112 detects an application failure if certain conditions are met. The conditions include but are not limited to whether the user interface is configured to run silently (e.g., without the knowledge of the user at the user terminal 106), whether the application failure is a certain type of failure (e.g., is a CreateProcess failure), and if the PMC 112 closed the error dialog box. If the conditions are met, then the healing program 102 displays a user interface indicating that the healing program 102 is attempting to repair the failed application. If the healing agent 114 cannot locate a package for repairing the application as described below, and the conditions are met, the healing program 102 displays a user interface indicating that the healing program 102 is not configured to repair the failed application.

The user interface includes an application repair wizard. The wizard has four pages: a welcome page, a package location page, a repair timing page, and a confirmation page. The welcome page is shown to a user at the user terminal 106 if either alternate locations of the application 104 within the lists 116 or delayed repair of the application 104 are allowed. The welcome page introduces the user to the wizard and includes a timeout feature that automatically starts the application repair if no interaction with the user interface occurs within a certain time threshold, e.g., the user does not click on a help button or a next button displayed on the user interface within so many seconds of displaying the user interface. The package location page is shown if alternate locations of the application in the lists 116 are allowed. The package location page allows the user to select the location from which the package will be installed. The repair timing page is shown if delayed repairs are allowed. The repair timing page allows the user to delay the repair until the next user login at the user terminal 106. The confirmation page confirms that reinstallation of the failed application will take place. If the confirmation page is the only page shown to the user, the confirmation page includes a timeout feature as described above for the welcome page.

Also when the PMC 112 detects 208 a failure, the PMC 112 calls 212 (loads and initiates execution of) the healing agent 114 with a command line including information about the failure, e.g., by making a CreateProcess call. The command line provides the healing agent 114 with information about the failure such as the type of failure (CreateProcess, LoadLibrary, etc.), verification information, repairing information, application restart information, and other types of similar information per different design considerations.

Figure 4A:
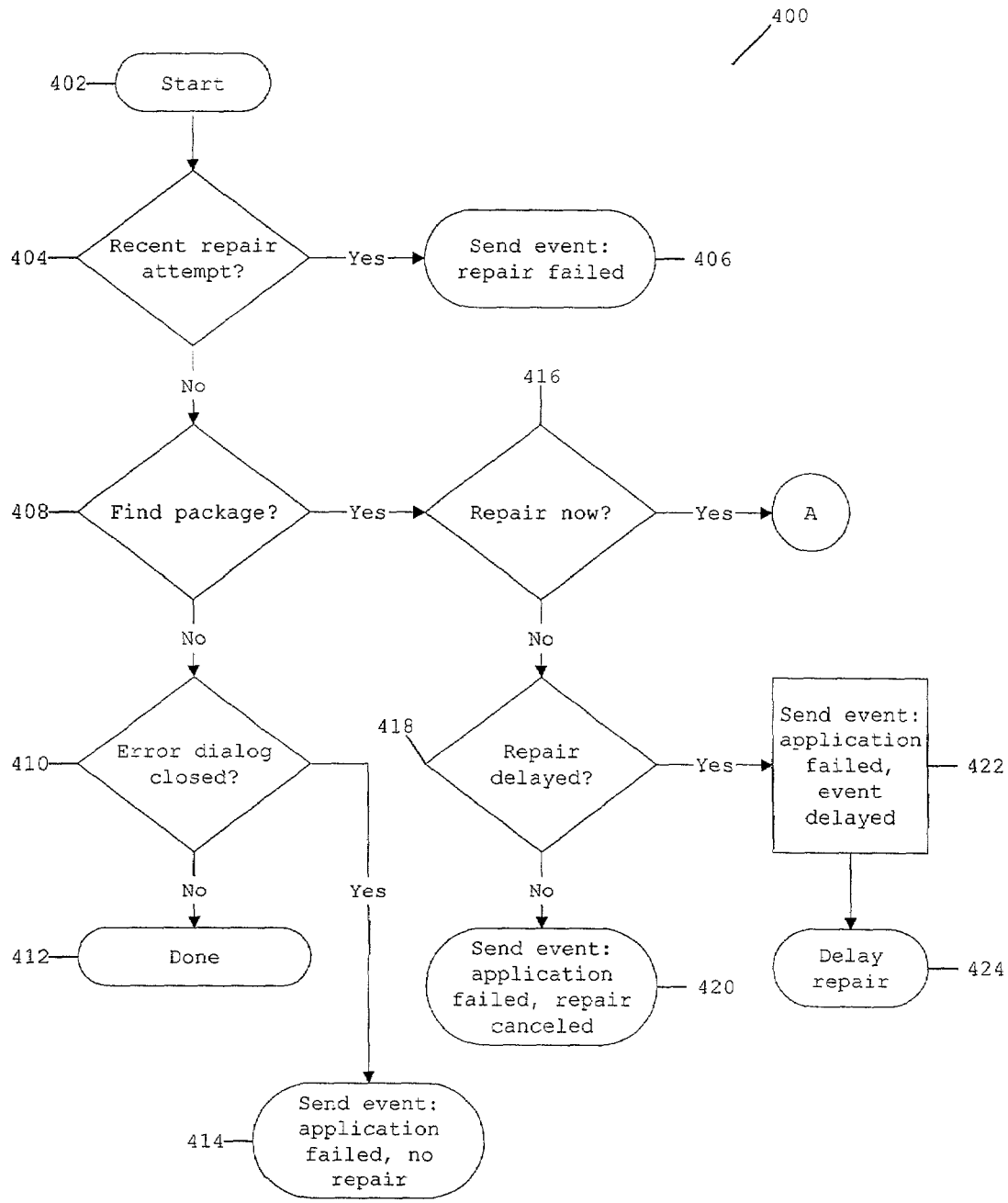
FIGS. 4A–B are flowcharts showing an application healing process.

Referring to FIG. 4A, the healing agent 114 begins 402 a healing process 400 to attempt to repair the failed application 104. Because the healing agent's attempt to repair the application 104 might fail, the healing agent 114 checks 404 to make sure that the failed application 104 was not just repaired. The healing agent 114 can determine whether the application 104 was just repaired based on whether the last attempt to repair the application 104 occurred within a predefined, prior time period, e.g., the last X minutes, the last Y seconds, etc. The administrator can configure the time period as part of the healing program 102. If an attempt to repair the application 104 was made within this time period, then the healing agent 114 sends 406 an appropriate event to the core manager 122 indicating that the repair failed.

If an attempt to repair the application 104 was not made within this time period, then the healing agent 114 has determined that the application 104 needs repairing. The healing agent 114 attempts 408 to find a package that should be used for repairing the failed application 104. This attempt includes determining the GUID and the location of the package.

The healing agent 114 checks each of the entries in the lists 116 for the filename of the failed application 104. If the application filename is included in multiple list entries, then the healing agent 114 uses the first list entry including the application filename that it encounters. A preferred list entry among the multiple list entries including the application filename is not determined, although the list entries could be evaluated and prioritized by, for example, the package associated with the application filename.

For some application errors, there may be multiple filenames associated with the application 104, e.g., an application filename and a library filename for LoadLibrary errors. The healing agent 114 uses the application filename in searching the lists 116. Once the application filename is found in the lists 116, the healing agent 114 searches the package associated with the application filename for other file(s) associated with the application 104. The healing agent 114 needs to find at least one other file in the package's information for the package to be eligible for use in an attempt to repair the failed application 104.

If the healing agent 114 does not locate the application filename in the lists 116, then no package exists (that the healing agent 114 knows about) that can repair the failed application 104. The healing agent 114 determines 410 if an error dialog box displayed to the user at the user terminal 106 indicating that the healing agent 114 is attempting to repair the application 104 is open or closed. If the error dialog box is open, then the healing process 400 is done 412. If the error dialog box is closed, then the healing agent 114 sends 414 an appropriate event to the core manager 122 indicating that the application 104 failed and that no repair package is available.

If the healing agent 114 does locate the application filename in the lists 116, the healing agent 114 identifies the location of the package (or a copy of the package) associated with the application filename. This location is indicated in the lists 116 as described above. The user at the user terminal 106 can, however, select another package location via the user interface as described above.

Once the healing agent 114 finds a package (and its location) for repairing the failed application 104, the healing agent 114 determines 416 whether to repair the failed application 104 now or later. The healing agent 114 may be configured to automatically attempt to repair the application at the next user login at the user terminal 106. Alternatively, the healing agent may be configured to prompt the user at the user terminal 106 as to whether the application 104 should be repaired now or at all. The user may also have the choice to delay the repair until a certain event occurs, such as at the next user login at the user terminal 106.

However the healing agent 114 is configured, if the healing agent 114 determines that the application healing should not happen now, then the healing agent 114 determines 418 if the repair is delayed. If the repair is not delayed, then a repair attempt will not be made at all, so the healing agent 114 sends 420 an appropriate event to the core manager 122 indicating that the application 104 failed and its repair has been cancelled. If the repair is delayed, then a repair attempt may eventually be made, so the healing agent 114 sends 422 an appropriate event to the core manager 122 indicating that the application 104 failed and its repair has been delayed. The healing agent 114 delays 424 repair of the failed application 104 until the appropriate time, e.g., when the next user login occurs.

Figure 4B:
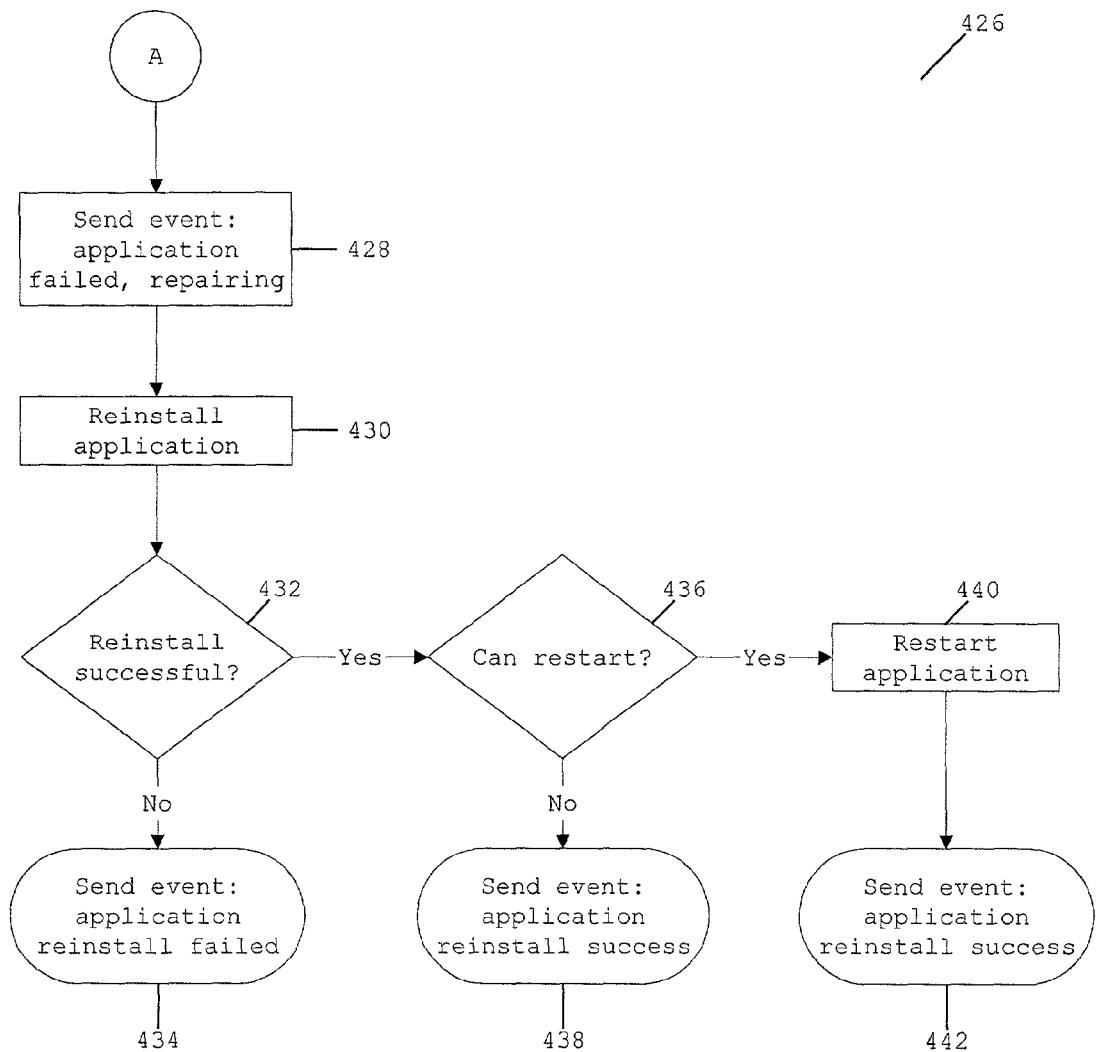

Referring to FIG. 4B, if the healing agent 114 determines that the application healing should occur now, then the healing agent 114 invokes 216 (see FIG. 2) the reinstalling agent 118 and performs a repair process 426. The healing agent 114 sends 428 an appropriate event to the core manager 122 indicating that the application 104 failed and that the reinstalling agent 118 is repairing (or imminently will be repairing) the application 104. The reinstalling agent 118 attempts to reinstall the failed application 104 using the located program (or otherwise repair the application 104 per the located program's instructions).

Once the reinstalling agent 118 completes the repairing, the healing agent 114 determines 432 the success of the repair (reinstallation). If the reinstallation failed, then the healing agent 114 sends 434 an appropriate event to the core manager 122 indicating that the application reinstallation failed.

If the reinstallation succeeded, then the healing agent 114 determines 436 if the repaired application 104 should be restarted. The application 104 may need to be restarted, for example, if the repairs cannot take effect without a reboot/restart of the application 104 or the user terminal 106, such as for CreateProcess. If a restart is not necessary, then the healing agent 114 sends 438 an appropriate event to the core manager 122 indicating that the application reinstallation succeeded. If a restart should occur, then the healing agent 114 restarts 440 the application 104 or the user terminal 106 as appropriate and sends 442 an appropriate event to the core manager 122 indicating that the application reinstallation succeeded.

During the healing process 400 and the repairing process 426, the healing agent 114 may generate and send events to the core manager 122 as described above. Note that these and other events may be configured in the healing program 102 by the administrator not to occur. The events include information that may be needed to identify the failure that occurred and what action the healing agent 114 is taking to remedy the failure. The healing agent 114 sends the event information to the core manager 122 using a protocol such as queued Internet Protocol (QIP). QIP enables the user terminal 106 to communicate events to the core manager 122 even if the user terminal 106 is not connected to the core manager 122 via the second communication link 124 when an application failure occurs.

The alerts component 128 at the core manager 122 receives the events, places/stores the events in the collection of data 126, and generates any appropriate alerts. The alerts component 128 generates the alerts to appear as if the user terminal 106 generated the alert (so the administrator(s) who receive the alerts associates the failure with the appropriate user terminal 106).

When an event arrives at the core manager 122, the core manager 122 places the event in the collection of data 126. The collection of data 126 is organized as two database tables, although the events can be organized using any combination of databases, tables, or other similar mechanisms. An events table records application healing events and includes some or all of the following fields for each recorded event:
  a) a unique identification name, code, number, symbol, etc. for the event in the events table,
  b) an identification name, code, number, symbol, etc. for the terminal on which the event occurred,
  c) an identification name, code, number, symbol, etc. for the package associated with the event,
  d) an identification name, code, number, symbol, etc. for the event that occurred,
  e) the date the event occurred,
  f) the time the event occurred,
  g) the location of the application associated with the event,
  h) the system error returned by the terminal that had the error,
  i) the error code for the reinstallation package, and
  j) other information per design considerations.

The collection of data 126 also includes a packages table that stores the packages that have been healed. The packages table includes some or all of the following fields:
  a) a unique identification name, code, number, symbol, etc. for the package in the packages table,
  b) an identification name, code, number, symbol, etc. for the package,
  c) the location of the package, and
  d) other information per design considerations.

Figure 5:
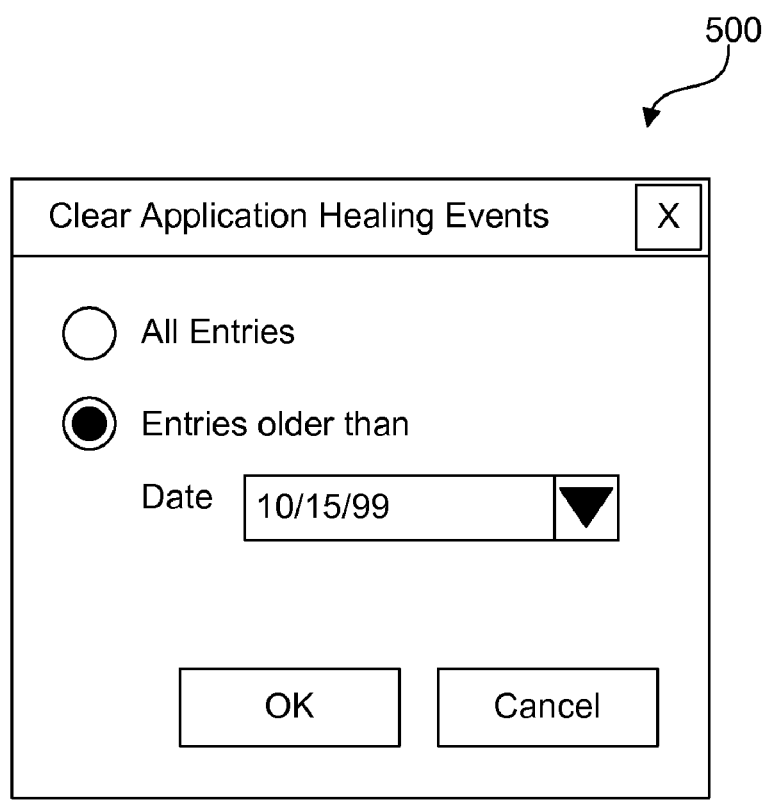
FIG. 5 shows a clear events screen.

Referring to FIG. 5, a clear events screen 500 enables an administrator at the core manager 122 or other terminal to remove stored events from the collection of data 126. The administrator can select to delete all events or events older than a certain date or time. The clear events screen 500 can be otherwise configured, e.g., to also enable the administrator to select certain events for deletion from a list of stored events.

Other embodiments are within the scope of the following claims.

What is claimed is:

1. A method comprising:
   configuring a repair mechanism at a location remote from a device to monitor system calls made by an application on the device;
   configuring the repair mechanism at the location remote from the device to repair the application if the repair mechanism detects a failure in at least one of the system calls made by the application;
   receiving the repair mechanism from the location remote from the device;
   monitoring the system calls made by the application on the device, wherein the monitoring includes examining the system calls to determine whether such system calls are executed properly;
   detecting a failure in at least one system call made by the application; and
   in response to the detecting of the failure in the at least one system call, initiating the repair mechanism to repair the application.

2. The method of claim 1 further comprising repairing the application with the repair mechanism.

3. The method of claim 2 further comprising restarting the application after the repair mechanism repairs the application.

4. The method of claim 1 in which a user of the device can determine the repair mechanism.

5. The method of claim 1 in which a user of the device can initiate the repair mechanism.

6. The method of claim 1 further comprising searching a collection of data including a plurality of repair mechanisms and a plurality of applications associated with each of the plurality of repair mechanisms for a repair mechanism that is configured to repair the application.

7. The method of claim 1 further comprising notifying a location remote from the device whether the repair mechanism successfully repaired the application.

8. The method of claim 1 further comprising recording the detected failure in a collection of data at a location remote from the device.

9. The method of claim 1 further comprising configuring a collection of data at a location remote from the device to include a plurality of repair mechanisms and a plurality of applications, each of the plurality of applications associated with a repair mechanism included in the plurality of repair mechanisms.

10. The method of claim 9 further comprising transmitting the collection of data to the device.

11. The method of claim 1 wherein the system calls are monitored by splicing in a function that determines if an error occurred before the system call is actually placed.

12. The method of claim 1 further comprising the step of determining when a previous attempt to repair the application was made.

13. An article comprising:
   a machine-readable medium which contains machine-executable instructions, the instructions being executable to:
      configure a repair mechanism at a location remote from a device to monitor system calls made by an application on the device;
      configure the repair mechanism at the location remote from the device to repair the application if the repair mechanism detects a failure in at least one of the system calls made by the application;
      receive the repair mechanism from the location remote from the device;
      monitor the system calls made by the application on the device, wherein the monitoring includes examining the system calls to determine whether such system calls are executed properly;
      detect a failure in at least one system call made by the application; and in response to the detecting of the failure in the at least one system call, initiate the repair mechanism to repair the application.

14. The article of claim 13 further causing a machine to repair the application with the repair mechanism.

15. The article of claim 13 further causing a machine to restart the application after the repair mechanism repairs the failure.

16. The article of claim 13 further causing a machine to search a collection of data including a plurality of repair mechanisms and a plurality of applications associated with each of the plurality of repair mechanisms for a repair mechanism that is configured to repair the application.

17. The article of claim 13 further causing a machine to notify a location remote from the device whether the repair mechanism successfully repaired the application.

18. The article of claim 13 further causing a machine to record the failure in a collection of data at a location remote from the device.

19. The article of claim 13 wherein the system calls are monitored by splicing in a function that determines if an error occurred before the system call is actually placed.

20. A system comprising:
    a first device configured to run an application;
    a mechanism included in the first device and configured to:
        monitor system calls made by the application, wherein the monitoring includes examining the system calls to determine whether such system calls are executed properly;
        detect a failure in at least one system call made by the application; and
        in response to the detecting of the failure in the at least one system call, initiate the mechanism to repair the application;
    a second device that is remote from the first device and in electronic conmiunication with the first device over a network, the second device being configured to configure the mechanism and to provide the mechanism to the first device, wherein the second device configures the mechanism to monitor system calls made by the application on the first device and to repair the application if the mechanism detects a failure in at least one of the system calls made by the application; and
    a third device that is remote from the first device and in electronic communication with the first device over the network, the third device being configured to track failures detected by the mechanism.

21. The system of claim 20 in which the mechanism is also configured to search a collection of data including a plurality of repair mechanisms and a plurality of applications associated with each of the plurality of repair mechanisms for a repair mechanism that is configured to repair the application.

22. The system of claim 21 in which the second device is also configured to configure the collection of data and to provide the collection of data to the first device.

23. The system of claim 20 in which the mechanism is also configured to perform the repair with the repair mechanism.

24. The system of claim 20 in which the mechanism is also configured to monitor the system calls made by the application.

25. The system of claim 20 in which the third device is also configured to notify the second device of the failure.

26. The system of claim 20 wherein the system calls are monitored by splicing in a function that determines if an error occurred before the system call is actually placed.

27. The system of claim 20 wherein the first device is a user terminal, the second device is an administrator terminal, and the third device is a core manager, wherein the user terminal is configured to run a plurality of applications, wherein the administrator terminal configures a healing program to be able to heal at least two of the applications on the user terminal, wherein the administrator terminal deploys the healing program to the user terminal, wherein the mechanism is configured to examine system calls made by at least two applications, wherein the healing program sends events regarding a failure to the core manager, and wherein the core manager stores the events in a database.

* * * * *

UNITED STATES PATENT AND TRADEMARK OFFICE
CERTIFICATE OF CORRECTION

| | |
|---|---|
| PATENT NO. | : 7,146,531 B2 |
| APPLICATION NO. | : 09/753082 |
| DATED | : December 5, 2006 |
| INVENTOR(S) | : Anthony N. Sarra et al. |

It is certified that error appears in the above-identified patent and that said Letters Patent is hereby corrected as shown below:

In Column 11, line 37, please replace "conmiunication" with --communication--.

Signed and Sealed this

Nineteenth Day of June, 2007

JON W. DUDAS
*Director of the United States Patent and Trademark Office*